(No Model.)

T. C. DOBBINS.
ELECTRICAL CIGAR LIGHTER.

No. 589,938. Patented Sept. 14, 1897.

Witnesses.
J. B. Bailey
A. M. Winch

Inventor
T. C. Dobbins
by J. A. Bailey
Attorney-in-fact.

UNITED STATES PATENT OFFICE.

TIMOTHY C. DOBBINS, OF TELLURIDE, COLORADO.

ELECTRICAL CIGAR-LIGHTER.

SPECIFICATION forming part of Letters Patent No. 589,938, dated September 14, 1897.

Application filed May 11, 1897. Serial No. 636,047. (No model.)

*To all whom it may concern:*

Be it known that I, TIMOTHY C. DOBBINS, a citizen of the United States, residing at Telluride, in the county of San Miguel and State of Colorado, have invented a new and useful Machine for Creating a Series of Electrical Short Circuits to be Used as a Cigar-Lighter, of which the following is a specification.

The object of my invention is to create a series of short circuits by means of bringing in contact with the electrical device hereinafter described an entirely separate piece of metal or other conductor of electricity so made that it will hold and retain on its surface a sufficient quantity of alcohol or other inflammable liquid to be ignited and burn for the length of time requisite for lighting cigars and for other obvious uses. I attain this object by the mechanism illustrated in the accompanying drawings, in which—

Figure 4:
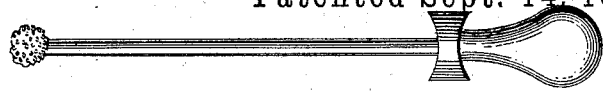
Figure 1:
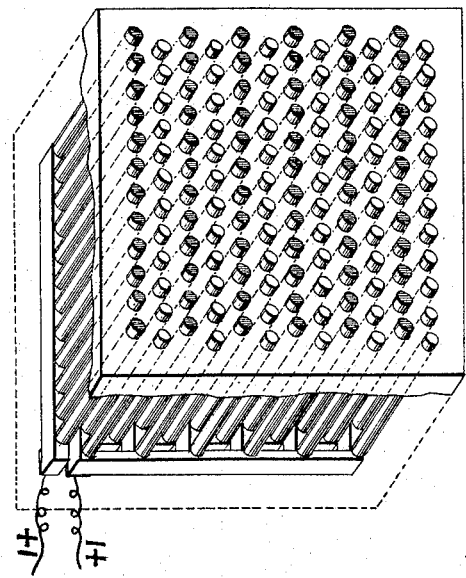
Figure 2:
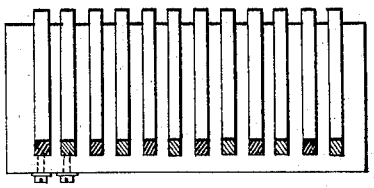
Figure 3:
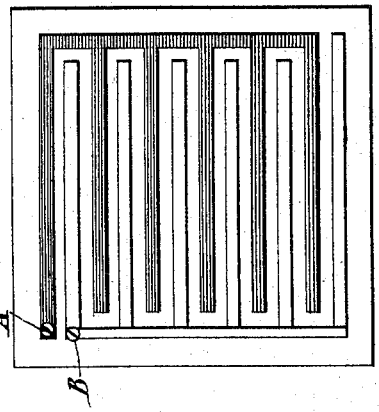

Figure 1 is a front-view perspective of the electrical device, consisting of a number of rows of metallic pegs made of any metallic conductor of electricity, preferably copper or brass, set not less than one-sixteenth of an inch apart, embedded in any non-combustible insulating material, preferably porcelain, and projecting one-eighth of an inch, more or less, from the insulating-surface, alternate rows of pegs being so connected together that one series of rows is positive and the other negative, as indicated in the drawings. Fig. 2, a cross-section, shows that the metallic pegs extending through the insulating material are attached to or are a part of metallic strips or bars, the back view of which is shown in Fig. 3. A B in Fig. 3 indicate the binding-posts to which the wires from electric battery or other electrical circuit are attached. Fig. 4 shows a metallic ball with holder, the ball being perforated, so as to hold a small quantity of alcohol.

When the binding-posts are connected with proper electrical current, a series of short circuits may be produced by drawing the metallic ball over the surface of the pegs. The arcs so created will ignite alcohol on the surface of the metallic ball, and it may be used as a cigar-lighter and for other useful purposes. Alternating or direct current from electrical circuit of any voltage may be used by inserting proper resistance, or from wet or dry battery by inserting suitable spark-coil.

What I claim as my invention, and desire to secure by Letters Patent, is—

The combination of a block having rows of insulated metallic pegs therein, the pegs in the alternate rows being electrically connected and adapted to be oppositely polarized, with a separate metallic igniting device constructed to be drawn across the surface of said pegs to create a series of short circuits, and thereby cause an ignition of the material on the igniting device, substantially as described.

TIMOTHY C. DOBBINS.

Witnesses:
W. S. CARHART,
S. R. FITZGARRALD.